United States Patent [19]

Pamer et al.

[11] Patent Number: 4,785,529
[45] Date of Patent: Nov. 22, 1988

[54] FASTENER MOUNTING APPARATUS

[75] Inventors: W. Richard Pamer; James A. Zils, both of Parma; John L. Barkocy, Hudson, all of Ohio

[73] Assignee: RB & W Corporation, Mentor, Ohio

[21] Appl. No.: 62,860

[22] Filed: Jun. 16, 1987

[51] Int. Cl.[4] .................... B23P 11/00; B23Q 7/10
[52] U.S. Cl. ................................ 29/707; 29/720; 29/798; 29/818
[58] Field of Search ............... 29/432, 798, 809, 818, 29/509, 765, 706, 707, 708, 720

[56] References Cited

U.S. PATENT DOCUMENTS

| | | | |
|---|---|---|---|
| 4,153,989 | 5/1979 | Shingo | 29/798 X |
| 4,164,072 | 8/1979 | Shingo | 79/798 X |
| 4,574,473 | 3/1986 | Sawdon | 29/798 |

*Primary Examiner*—Timothy V. Eley
*Attorney, Agent, or Firm*—Tarolli, Sundheim & Covell

[57] ABSTRACT

A fastener mounting apparatus includes a punch which is connected with a base to be mounted on one section of a press and a fastener mounting section which is movable relative to the punch during operation of the press. A conveyor is operable to conduct fasteners to a loading station in the fastener mounting section. An ejector assembly applies force against a slug cut from a member to move the slug away from a die. The ejector assembly includes a pin disposed in a coaxial relationship with the punch and a spring assembly offset to one side of the punch. A force transmitting member or rocker arm transmits force from the spring assembly to the ejector pin. A loading force applied against the fasteners by the conveyor is terminated during a portion of each operating cycle of the press to reduce the force urging the fasteners toward the loading station and prevent jamming of fasteners at the loading station. In one embodiment of the invention, a latch or retainer assembly is provided to hold the mounting section in a position in which the punch blocks movement of the fasteners to the loading station.

17 Claims, 6 Drawing Sheets

FASTENER MOUNTING APPARATUS

BACKGROUND OF THE INVENTION

The present invention relates to a new and improved fastener mounting apparatus and more specifically to a fastener mounting apparatus which is used with a press to mount fasteners during operation of the press.

A fastener mounting apparatus which is used with a press is disclosed in U.S. Pat. No. 4,153,989 issued May 15, 1979 and entitled Automatic Piercing Nut Assembling Arrangement. The fastener mounting apparatus disclosed in this patent includes a punch which is mounted on one platen of a press. A fastener mounting section is movable relative to the punch during operation of the press. A post guides the movement between the fastener mounting section and punch during operation of the press. A conveyor is connected with the fastener mounting section and conducts fasteners to the mounting section.

SUMMARY OF THE INVENTION

The present invention relates to an apparatus which is used with a press to mount fasteners during operation of the press. As the press is closed, a fastener mounting section engages a member and is moved relative to a punch. As the fastener mounting section moves relative to the punch, the punch applies force against the fastener to press the fastener against the member and sever a portion or slug from the member.

An ejector assembly applies force against the member during mounting of the fastener to move the slug away from a die. The ejector assembly includes an ejector pin which is disposed in a coaxial relationship with and is at least partially enclosed by the punch. A spring assembly is offset to one side of the punch. A rocker arm transmits force from the spring assembly to the ejector pin to press the ejector pin against the member in which the fastener is to be mounted at a location which is coaxial with the punch.

A conveyor is connected with the fastener mounting section and holds a series of fasteners which are sequentially conducted to a loading station during operation of the press. The conveyor applies a loading force against the series of fasteners urging the series of fasteners toward a loading station during a portion of each operating cycle of the press to thereby move the leading fastener in the series of fasteners to the loading station. The force applied against the series of fasteners by the conveyor is terminated during another portion of the operating cycle of the press to reduce the force urging the fasteners toward the loading station. By reducing the force which urges the fasteners toward the loading station, a jamming of the fasteners with each other and/or the punch at the loading station is prevented.

In one embodiment of the invention, a retainer assembly is operable to hold the fastener mounting section in an intermediate position in which the punch extends into the loading station to block movement of fasteners to the loading station. As the conveyor starts to apply the loading force against the fasteners in the conveyor, the retainer assembly releases the fastener mounting section for movement from the intermediate position to an extended position. When the mounting section is in the extended position, the punch is spaced from the loading station to enable a fastener to move into the loading station.

Accordingly, it is an object of this invention to provide a new and improved apparatus which is used with a press to mount a fastener in a member and wherein an ejector pin is disposed in a coaxial relationship with a punch and is pressed against the member in which the fastener is to be mounted by a spring assembly which is offset to one side of the punch.

Another object of this invention is to provide a new and improved fastener mounting apparatus for use with a press and wherein a conveyor applies a force against a series of fasteners urging a fastener toward a loading station during one portion of an operating cycle of the press and terminates the application of the loading force against the series of fasteners during another portion of an operating cycle of the press to reduce the force urging the fasteners toward the loading station.

Another object of this invention is to provide a new and improved fastener mounting apparatus for use with a press and wherein a retainer assembly retains a fastener mounting section in an intermediate position in which a punch blocks movement of a fastener to a loading station during a portion of an operating cycle of the press.

BRIEF DESCRIPTION OF THE DRAWINGS

The foregoing and other objects and features of the present invention will become more apparent upon a consideration of the following description taken in connection with the accompanying drawings wherein.

DESCRIPTION OF THE SPECIFIC PREFERRED EMBODIMENTS OF THE INVENTION

General Description

A fastener mounting apparatus 20 (FIG. 1) is connected with the upper platen or section 22 of a punch press. The upper platen 22 of the punch press moves downwardly toward a die 24 mounted on a stationary lower platen or section 26 as the press closes. During opening of the press, the upper platen 22 moves away from the stationary lower platen 26. Of course, the fastener mounting apparatus 20 could be mounted on either a movable or stationary section or platen of a press and could be mounted on either the upper or lower platens.

During each cycle of operation of the press, the fastener mounting apparatus 20 sequentially mounts a plurality of fasteners in a plurality of members. The fastener mounting apparatus 20 includes a base 32 which is fixedly connected with the upper platen 22. A rectangular mounting section 34 is movable toward and away from the base 32 between an extended position (FIGS. 1 and 4) and a retracted position (FIG. 6) during each cycle of operation of the press. Fasteners 38 (FIG. 4) are sequentially moved to a loading station 40 in the mounting section 34 by a conveyor 42. Each fastener in turn is engaged at the loading station 40 by a pair of resilient grippers 46 and 48 (FIGS. 2 and 3) to hold the fastener in axial alignment with a punch 50 (FIG. 1).

The punch 50 has a leading or lower end surface 52 (FIG. 1) which engages the upper side of a fastener 38 (FIG. 5) at the loading station 40. During operation of the press from the open condition illustrated in FIG. 44 to the closed condition illustrated in FIG. 6, the punch 50 cooperates with the die 24 to mount a fastener 38 in a sheet metal workpiece or other member 56. As the fastener 38 is pressed into the sheet metal member 56 by the punch 50, a circular slug or piece 58 (FIG. 6) is severed from the member by the cooperation between the die 24 and fastener 38.

Figure 1:
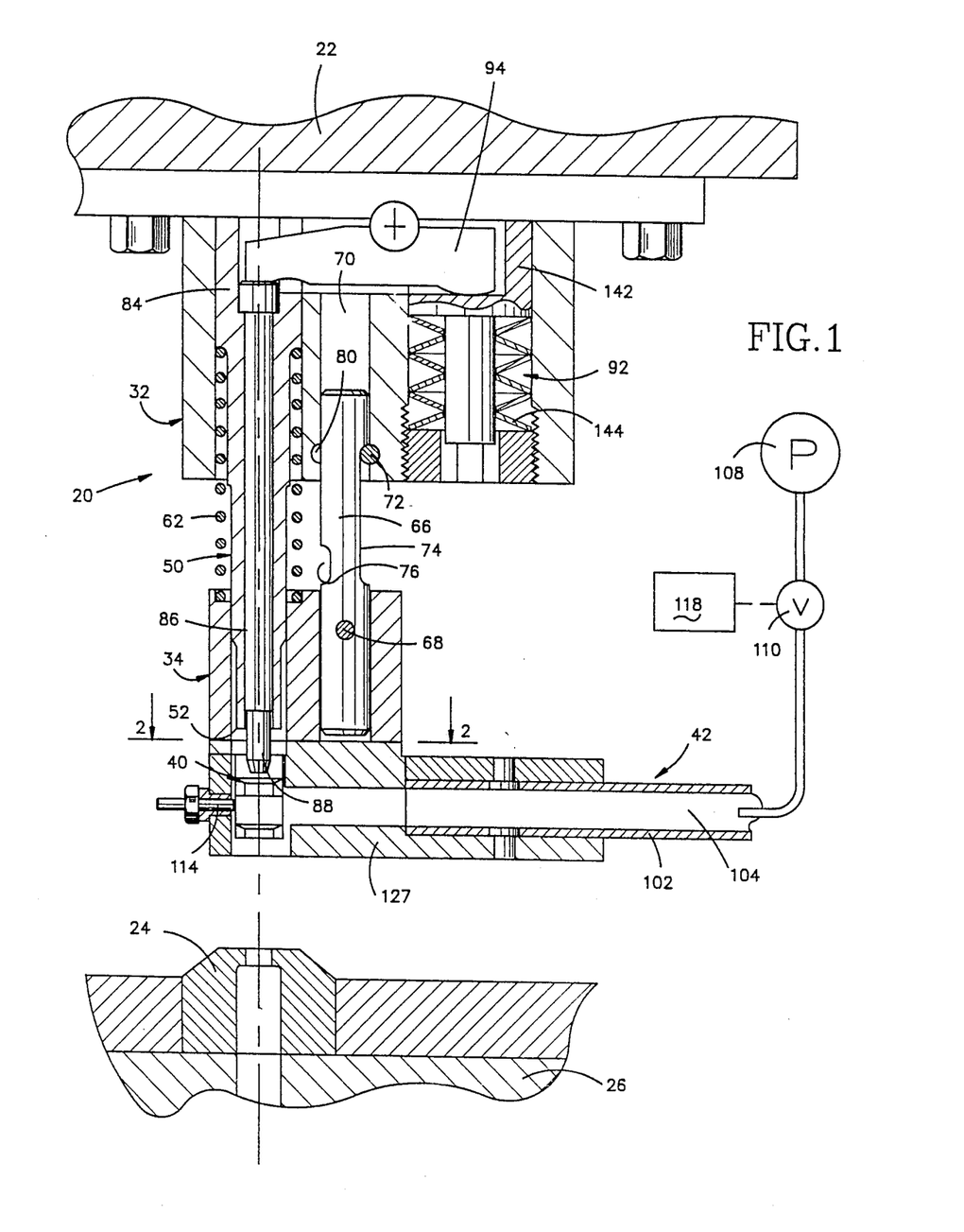
FIG. 1 is an elevational sectional view of a fastener mounting apparatus constructed in accordance with the present invention and mounted . in a press.
Figure 4:
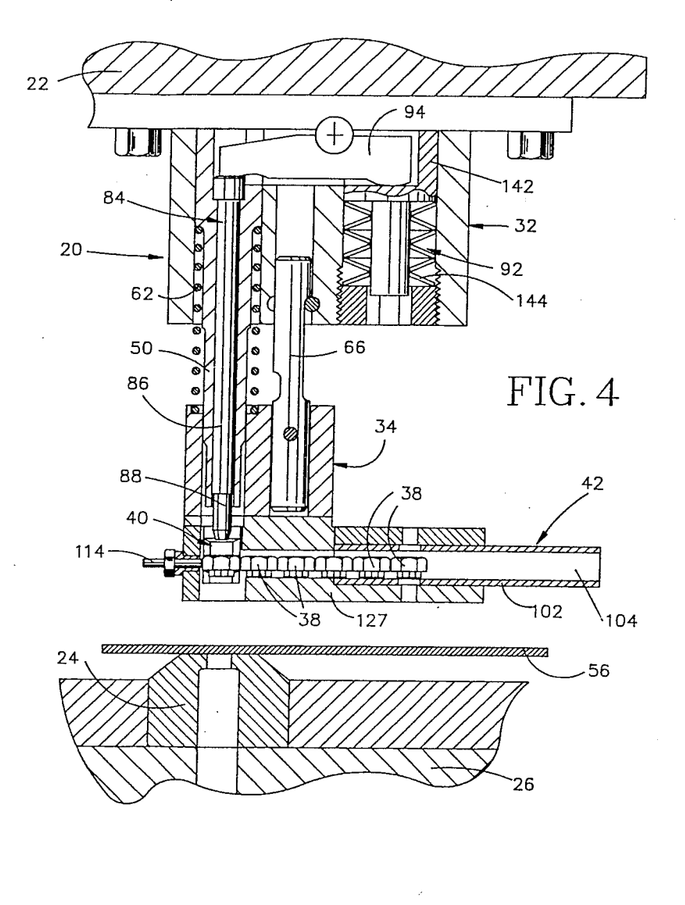
FIG. 4 is a sectional view, generally similar to FIG. 1, of the fastener mounting apparatus in an extended condition with a fastener at the loading station.
Figure 6:
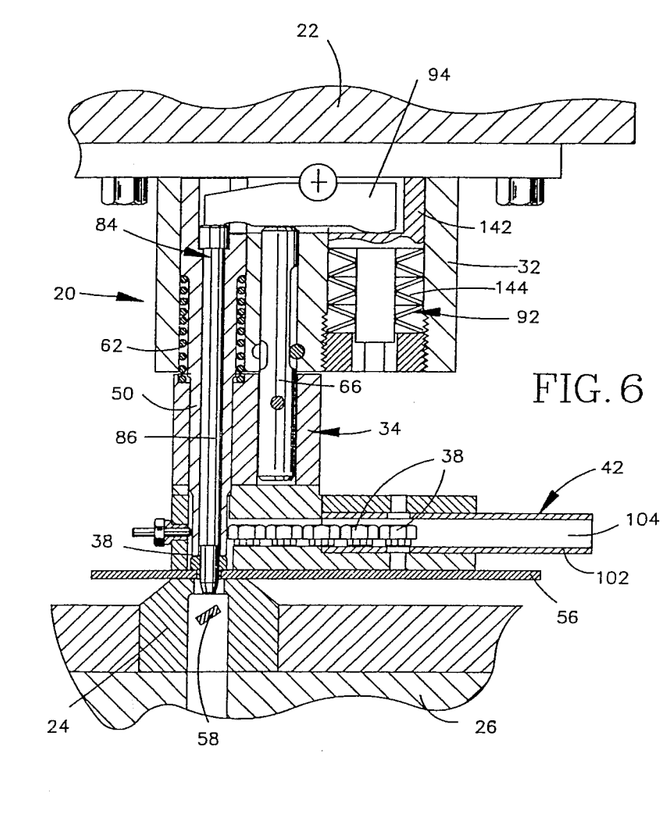
FIG. 6 is a sectional view, generally similar to FIG. 5, illustrating the manner in which a fastener is mounted in the sheet metal member and the manner in which the ejector pin moves a slug severed from the member.
Figure 7:
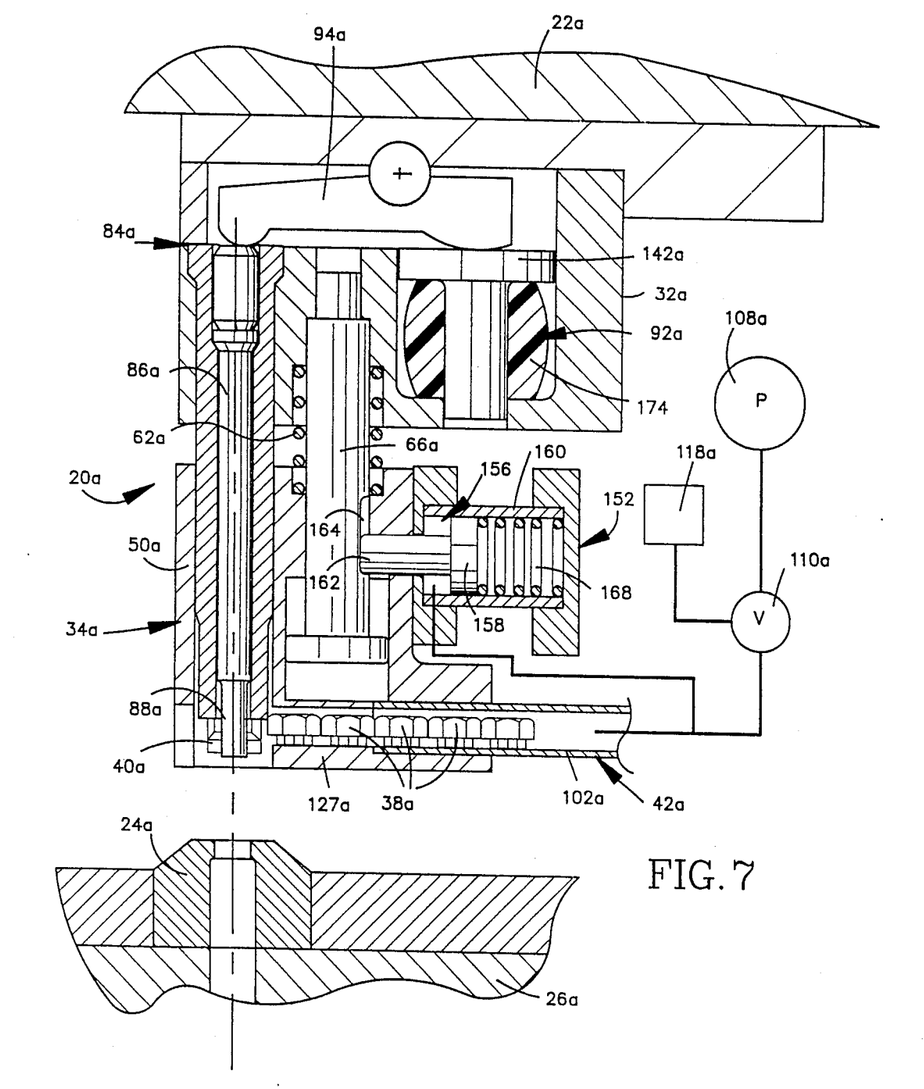
FIG. 7 is an elevational sectional view, generally similar to FIG. 1, of a fastener mounting apparatus which forms a second embodiment of the invention, the fastener mounting apparatus being shown in an intermediate position in which a punch blocks movement of fasteners to a loading station.

As the press operates from the closed condition shown in FIG. 6 back to the open condition shown in FIG. 4, a main spring 62 moves the mounting section 34 downwardly away from the base 32 so that the mounting section moves from the retracted position of FIG. 6 back to the extended position of FIGS. 1 and 4. The main spring 62 is a helical coil spring and is disposed in a coaxial relationship with the generally cylindrical punch 50.

A guide post 66 guides relative movement between the base 32 and mounting section 34. The generally cylindrical guide post 66 (FIG. 1) is fixedly secured to the mounting section 34 by a pin 68 and extends upwardly into a cylindrical opening 70 in the base 32. A guide pin 72 secured to the base 32 and engages a flat bottom surface 74 of an axially extending recess in the side of the post 66. The pin 68 prevents rotation of the guide post 66 relative to the base 32. A second recess 76 (FIG. 1) in the opposite side of the guide post 66 is engageable by a locking pin (not shown) extending through a recess 80 in the base 32 when the mounting section 34 is in a fully retracted position.

An ejector assembly 84 presses the sheet metal member 56 against the die 24 (FIG. 5) and moves the slug 58 (FIG. 6) away from the die. The ejector assembly 84 includes a generally cylindrical ejector pin 86 which is disposed in a coaxial relationship with and is enclosed by the punch 50 (FIG. 1). The ejector pin 86 has a cylindrical leading end portion which moves into a central opening in a fastener 38 to align the fastener with the punch 50 as the press is operated from an open condition toward the closed condition.

Figure 5:
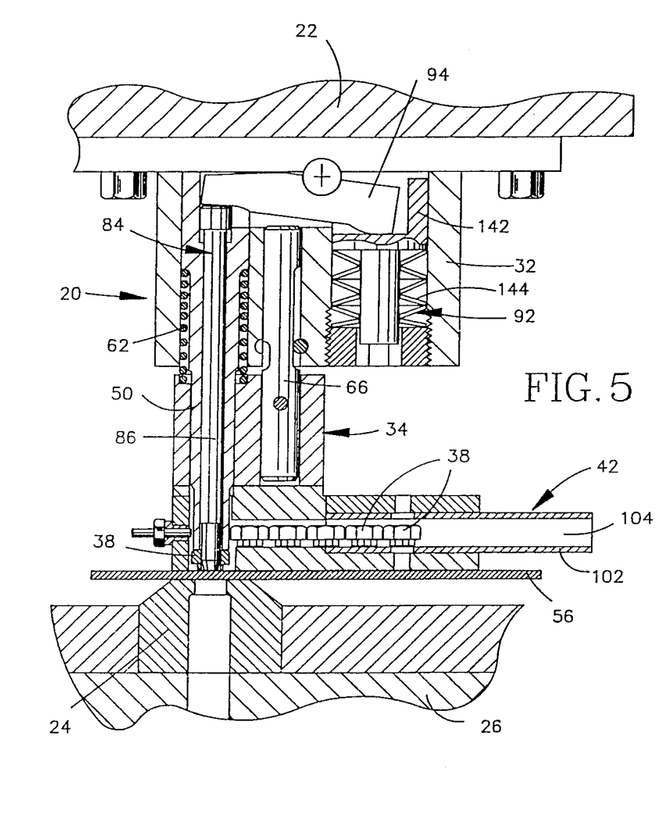
FIG. 5 is a sectional view, generally similar to FIG. 4, illustrating the manner in which a punch presses the fastener downwardly from the loading station against a sheet metal member and the manner in which an ejector pin is pressed against the member by a spring assembly.

The ejector pin 86 extends through the fastener to apply force against the sheet metal member 56 to press the member against the die 26 immediately before the fastener 38 is mounted in the sheet metal member (FIG. 5). Thus, a biasing force is transmitted from a spring assembly 92 by a rocker arm 94 to the upper end of the ejector pin 86. This biasing force urges the ejector pin 86 toward the extended position shown in FIG. 1 relative to the punch 50. As the punch press is operated to the closed condition, the force applied to the leading end 88 of the ejector pin 86 by the sheet metal member 56 causes the ejector pin to be retracted axially into the punch 50 against the influence of the spring assembly 92 (FIG. 5).

As the fastener 38 and die 24 cooperate to sever the slug 58 from the sheet metal member 56, the force applied by the spring assembly 92 against the rocker arm 94 pivots the rocker arm from the position shown in FIG. 5 to the position shown in FIG. 6. This moves the ejector pin 86 axially relative to the punch 50. As the ejector pin 86 moves from the position shown in FIG. 5 to the position shown in FIG. 6, the ejector pin moves the slug 58 away from the remainder of the workpiece 56. It should be understood that although the mounting apparatus 20 has been illustrated in FIGS. 4-6 as mounting the fasteners 38 in a sheet metal member 56, the mounting apparatus 20 could be used to mount fasteners in many different types of members, for example, in relatively stiff brace members, brackets or mounting tabs.

Conveyor

The fasteners 38 are sequentially conducted to the loading station 40 (FIG. 1) in the mounting section 34 by the conveyor 42. The conveyor 42 includes a flexible tube 102 which is fixedly connected to the mounting section 34. The flexible tube 102 has a central passage 104 with a rectangular cross section which is sized to receive a particular fastener 38 without hindering movement of the fastener along the tube. The flexible tube 102 is filled with a series of fasteners 38 in the manner described in U.S. patent application Ser. No. 870,082 filed June 3, 1986 by Messrs. Zils and Markovic and entitled Method and Apparatus for Loading Articles.

Figure 2:
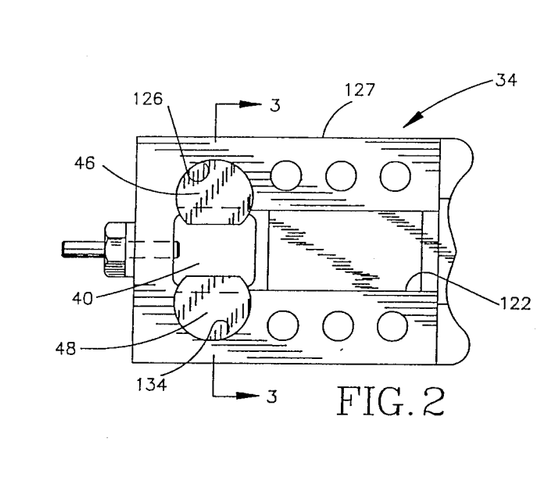
FIG. 2 is a plan view, taken generally along the line 2—2 of FIG. 1, and illustrating the relationship between a pair of grippers which ,engage opposite sides of a fastener at a loading station.
Figure 3:
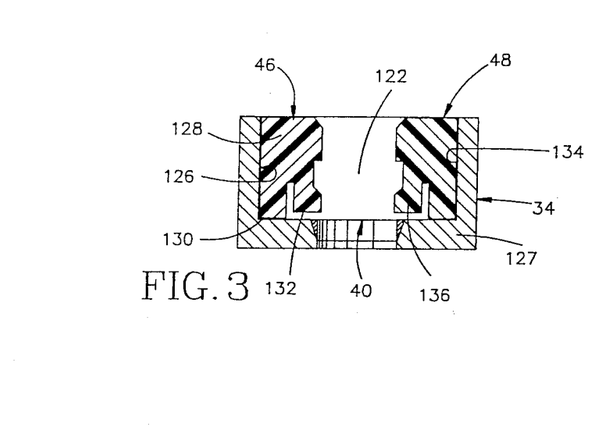
FIG. 3 is a sectional view, taken generally along the line 3'3 of FIG. 2, further illustrating the construction of the grippers.

Air pressure from a pump 108 (FIG. 1) is transmitted through an open valve 110 to the tube 104. The air pressure applies a loading force against the series of fasteners 38 in the tube 104 urging the fasteners toward the loading station 40. The leading fastener in the series of fasteners in the conveyor 42 is held at the loading station 40 by the gripper members 46 and 48 (FIGS. 2 and 3). The presence of a fastener at the mounting station 40 is detected by engagement of the fastener with an electrical contact post 114 (FIG. 1).

The valve 110 is connected to controls 118 for the press. The controls 118 operate the valve between an open condition in which air pressure from the pump 108 applies a loading force against the series of fasteners in the tube 102 and a closed condition in which the loading force applied against the fasteners is reduced. During the portion of a press operating cycle in which the press moves from the closed condition of Fig. 6 to the open condition of FIG. 4, the valve 110 is maintained in the open condition by the controls 118. Therefore, the series of fasteners in the conveyor tube 102 are continuously urged toward the loading station by the air pressure from the pump 108 as the press is operated from the closed condition (FIG. 6) to the open condition (FIG. 4). This results in a leading fastener in the series of fasteners being moved to the loading station 40 as the mounting apparatus 20 is operated from the retracted condition of FIG. 6 to the extended condition of FIGS. 1 and 4 after mounting a fastener 38 in the member 56.

Immediately before the press is closed to mount a next succeeding fastener 38 which is at the loading station 40, the controls 118 operate the valve 110 to the closed condition. This terminates the loading force applied against the series of fasteners in the conveyor tube 102. Therefore, as the punch 50 enters the loading station 40, the series of fasteners in the conveyor tube 102 are not urged toward the loading station in a manner which could cause interference between the fasteners, punch 50, ejector pin 86 and/or mounting section 34 with a resulting jamming of the fastener mounting apparatus 20. The next fastener 38 to be mounted in the member 56 is securely held in alignment with the punch 50 by the gripper members 46 and 48 (FIGS. 2 and 3) even though the air pressure force against the series of fasteners in the conveyor tube 42 has been terminated.

Although it is preferred to open and close the valve 110 to provide for the intermittent application of a loading force against a series of fasteners in a conveyor tube 102 in the manner previously explained, the valve 110 could be continuously open to apply a loading force which constantly urges the fasteners toward the loading station. Although the fasteners 38 could have many different constructions, in one specific instance the fasteners 38 were self piercing clinch nuts which are commercially available from RB&W Corporation of 8341 Tyler Boulevard, Mentor, Ohio and sold under the Trademark SPAC HG NUT. This fastener is available in various sizes from ¼ inch to ½ inch for use with materials from 0.064 to 0.354 inches thick. Fasteners 38 have a construction similar to that disclosed in U.S. Pat. Nos. 3,399,705 and 4,432,681. Of course, other known types of fasteners could be used if desired.

Fastener Gripper Assembly

Each of the fasteners 38 in turn is held at the loading station 40 in axial alignment with the punch 50 and ejector pin 86 by the grippers 46 and 48 (FIGS. 2 and 3). The grippers 46 and 48 are disposed on opposite sides of a path along which the conveyor 42 transports the fasteners 38. Thus, the fasteners 38 are sequentially conducted along a conveyor passage 122 which is a continuation of the passage 104 in the conveyor tube 102. The passage 122 terminates at the loading station 40. The grippers 46 and 48 are disposed on opposite sides of the loading station 40. The grippers 46 and 48 project into the loading station 40 (FIG. 3) for a distance sufficient to resiliently grip opposite sides of a fastener conducted to the loading station by the conveyor 42.

The gripper 46 has a generally cylindrical configuration. The gripper 46 is received in a generally cylindrical opening 126 formed in a base 127 of the mounting section 34 (FIG. 2). The body 128 of the gripper 46 has an axially extending slot 130 which separates a gripper leg 132 from the remainder of the body of the gripper.

The gripper 48 has the same construction as the gripper 46 and is provided with a gripper leg 136. The gripper legs 132 and 136 are disposed on opposite sides of the loading station 40. When a fastener 38 is conducted to the loading station 40, the gripper legs 132 and 136 are resiliently deflected by opposite sides of the fastener and to securely hold the fastener in axial alignment with the punch 50.

Upon closing of the press, the mounting section 34 moves into engagement with the member 56 and is forced upwardly toward the base 32 against the influence of the main spring 62. As this happens, the punch 50 engages the hexagonal head end of a fastener 38 held by the grippers 46 and 48. Continued closing of the press causes the mounting section to move further upwardly toward the base 32. The lower end face 52 (FIG. 1) of the punch applies pressure against the head of the fastener 38 at the loading station 40 to move the fastener downwardly into engagement with a member 56 in which the fastener is to be mounted (see FIG. 5). As the press moves to a fully closed condition (FIG. 6), the fastener 38 pierces the member 56 and is clinched in place by the die 24 (FIG. 6).

Ejector Assembly

The ejector assembly 84 is operable to apply force against the sheet metal member 56 to press the sheet metal member against the die 24 immediately before the sheet metal member is engaged by the lower shank or mounting end of a fastener 38. As the fastener is pressed downwardly against the sheet metal member 56 by the punch 50, the fastener cooperates with the die 24 to sever a slug or piece 58 (FIG. 6) from the remainder of the sheet metal member. The ejector assembly 84 applies a force against the slug 58 as it is severed from the sheet metal member 56 to move the slug away from the remainder of the member and clear the upper end portion of the die 24 for a next succeeding fastener mounting operation.

The ejector assembly 84 includes the ejector pin 86, spring assembly 92 and force transmitting member or rocker arm 94. The ejector pin 86 is coaxial with and enclosed by the punch 50. As the press closes and the mounting section 34 toward the base 32 from the extended position of FIGS. 1 and 4, the leading or lower end 88 of the ejector pin 86 moves into a central opening of fastener 38 (see FIGS. 4 and 5). The leading end of the ejector pin 88 moves into the opening in the fastener 38 before the fastener is engaged by the punch 50. Therefore, the ejector pin 86 telescopically enters the fastener 38 while the fastener is held at the loading station 40 by the grippers 46 and 48 to positively align the fastener with the punch 50.

As the press keeps closing, the leading end 88 of the ejector pin 86 moves through the fastener into engagement with an upper side surface of the sheet metal member 56. Downward movement of the ejector pin 86 toward the stationary die 24 is stopped by engagement of the ejector pin with the sheet metal member 56. As this occurs, forces are transmitted from the sheet metal member 56 through the ejector pin 86 to the rocker arm 94. These forces cause the rocker arm 94 to pivot in a clockwise direction from the position shown in FIG. 4 to the position shown in FIG. 5. As the rocker arm 94 is pivoted, a piston 142 is pressed downwardly against conical annular springs or Belleville washers 144 in the spring assembly 92. Of course, springs other than the Belleville washers 144 could be used if desired.

Continued downward movement of the upper press platen 22 toward the stationary lower platen 26 causes the punch 50 to press the fastener 38 against the sheet metal member 56. The lower shank or piercing end of the fastener 38 cooperates with the die 24 to sever a circular slug 58 (FIG. 6) from the workpiece 56. As the slug 58 is severed from the workpiece 56, the spring assembly 92 causes the rocker arm 94 to pivot in a counterclockwise direction from the position shown in FIG. 5 to the position shown in FIG. 6. As this occurs, the ejector pin 86 moves the slug 56 downwardly away from the open end of the die 24.

The central axes of the punch 50, ejector pin 86, guide post 66 and spring assembly 94 extend parallel to each other and are disposed in a common plane which extends parallel to the path of movement of the press and perpendicular to the upper side of the workpiece 56. The rocker arm 94 pivots about an axis which extends perpendicular to the plane containing the central axes of the punch 50, guide post 66, and spring assembly 92. The axis about which the rocker pin 94 pivots is disposed between the central axes of the guide post 66 and spring assembly 92. The central axis of the guide post 66 and the central axis of the spring assembly 92 are offset on the same side of the punch 50. The axis about which the rocker arm 94 pivots is spaced further from the central axis of the punch 50 than from the spring assembly 92 to provide the ejector pin 86 with a longer lever arm and therefore greater mechanical advantage than the spring assembly.

Second Embodiment of the Invention

In the embodiment of the invention illustrated in FIGS. 1-6, the mounting section 34 moves to the extended position shown in FIG. 1 in which the punch 50 is spaced from the loading station 40 whenever the press is operated to the open condition. In the embodiment of the invention illustrated in FIG. 7-10, the fastener mounting apparatus can be maintained in an intermediate position upon opening of the press. When the fastener mounting apparatus is in the intermediate position (FIG. 7), the punch extends far enough into the loading station to block movement of fasteners to the loading station by the conveyor. Since the embodiment of the invention illustrated in FIGS. 7-10 is generally similar to the embodiment of the invention illustrated in FIGS. 1-6, similar numerals will be utilized to designate similar components, the suffix letter "a" being associated with the numerals of FIGS. 7-10 to avoid confusion.

The fastener mounting apparatus 20a is connected with the movable upper platen or section 22a of a punch press. The upper section 22a of the press is movable relative to a die 24a and a stationary lower platen 26a of the press. A base 32a is connected with the upper platen 22a. A mounting section 34a is movable toward and away from the base 32a between the intermediate position (FIG. 7), an extended position (FIG. 8), and a retracted position (FIG. 10).

Fasteners 38a are sequentially moved to a loading station 40a in the mounting section 34a (FIG. 8) by a conveyor 42a. Each of the fasteners 38a is gripped in turn at the loading station 40a by gripper members disposed on opposite sides of the loading station 40a. The grippers have the same construction as the grippers 46 and 48 of FIGS. 2 and 3.

Figure 9:
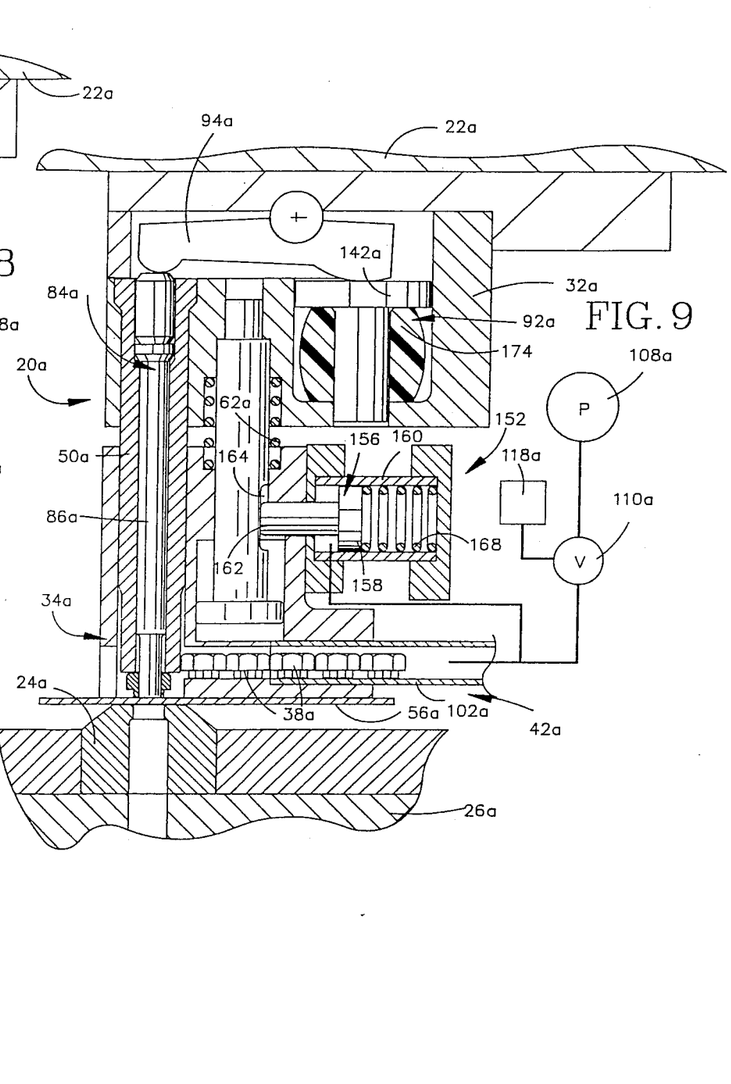
FIG. 9 is a sectional view generally similar to FIG. 8, illustrating the manner in which a fastener is pressed against a sheet metal member by the punch and the manner in which an ejector pin is pressed against the member by a spring assembly immediately prior to mounting of the fastener in the member.
Figure 10:
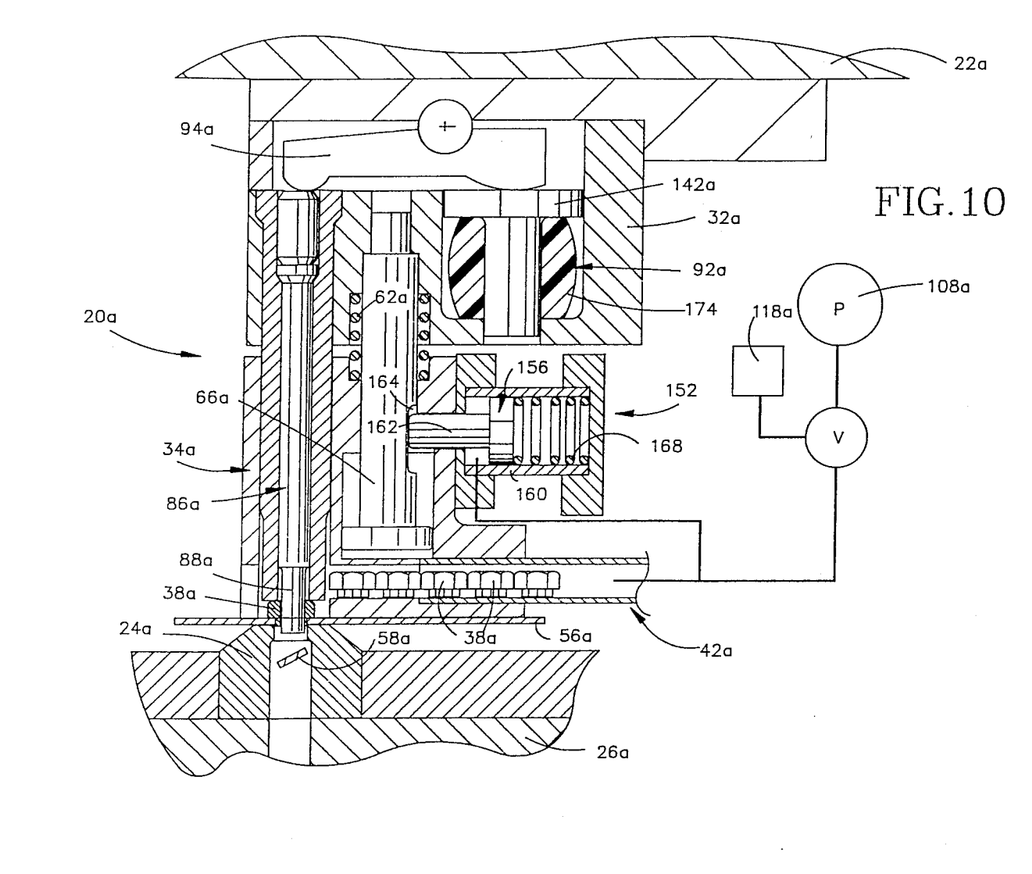
FIG. 10 is a sectional view, generally similar to FIG. 9, illustrating the manner in which a fastener is mounted in the sheet metal member and the manner in which the ejector pin moves a slug severed from the member.

A punch 50a forces the fasteners 38a into a sheet metal workpiece or member 56a as the press is operated to move the upper platen 22a downwardly toward the lower platen 26a (see FIGS. 9 and 10). A main spring 62a is coaxial with a guide post 66a and urges the mounting section 34a downwardly away from the base 32a as the press opens. The guide post 66a guides relative movement between the base 32a and mounting section 34a. The generally cylindrical guide post 66a has an upper end portion which is fixedly connected to the base 32a and a lower end portion which is slidably received in the mounting section 34a.

An ejector assembly 84a aligns a fastener 38a at the loading station 40a with the punch 50a, presses the sheet metal member 56a against the die 24a, and moves a slug 58a cut from the sheet metal member away from the die during closing of the press. The ejector assembly 84a includes an ejector pin 86a which is coaxial with and surrounded by the punch 50a, a spring assembly 92a and a force transmitting member or rocker arm 94a. The force transmitting member or arm 94a transmits the force between the spring assembly 92a and the ejector pin 86a.

The central axes of the punch 50a, ejector pin 86a, guide post 66 and spring assembly 94a extend parallel to each other and are disposed in a common plane which extends parallel to the path of movement of the press and perpendicular to the upper side of the workpiece 56a. The rocker arm 94a pivots about an axis which extends perpendicular to the plane containing the central axes of the punch 50a, guide post 66a, and spring assembly 92a. The axis about which the rocker pin 94a pivots is disposed between the central axes o the guide post 66a and spring assembly 92a. The central axis of the guide post 66a and the central axis of the spring assembly 92a are offset on the same side of the punch 50. The axis about which the rocker arm 94a pivots is spaced further from the central axis of the punch 50a than from the spring assembly 92a.

In accordance with a feature of this embodiment of the invention, a latch or retainer assembly 152 is provided to hold the mounting section 34a in a intermediate position (FIG. 7) in which the punch 50a blocks movement of a leading fastener in a series of fasteners 38a disposed in the conveyor 42a to the loading station 40a. This prevents the next fastener 38a to be mounted on a workpiece from being prematurely moved into the loading station 40a.

The retainer or latch assembly 152 (FIG. 7) includes a piston 156 having a cylindrical head end 158 which is disposed in a cylinder 160. A cylindrical rod 162 extends from the piston head 158 and engages a longitudinally extending groove 164 in the guide post 66a to hold the mounting section 34a against movement away from the base 32a under the influence of the main spring 62a. A helical coil spring 168 urges the piston rod 162 into the groove 164 in the guide post 66a.

When a fastener 38a is to be mounted on a workpiece 58a, the press controls 118a are actuated to open a valve 110a to connect an air pump 108a in fluid communication with the conveyor tube 102a and with the rod end of the cylinder 160. The fluid pressure applied against the rod end of the piston 156 moves the piston from the extended position of FIG. 7 to the retracted position of FIG. 8 against the influence of a biasing spring 168. This moves the piston rod 162 out of the groove 164 to release the mounting section 34a for downward movement relative to the base 32a under the influence of the main spring 62a.

At the same time, air pressure is conducted from the valve 110a to the conveyor tube 102a. The fluid pressure in the conveyor tube 102a urges the series of fasteners 38a toward the loading station 40a. This moves the leading fastener 38a in the series of fasteners into axial alignment with the ejector pin 86a and punch 50a (FIG. 8).

After the press has been operated to the open condition and the leading fastener in a series of fasteners 38a in the conveyor tube 102 has moved to the loading station 40a, the press controls 118a operate the valve 110a to vent the cylinder 160 and eliminate the air pressure against the fasteners in the conveyor tube. When this occurs, the piston 156 is moved toward the left (as viewed in FIG. 8) by the spring 168. Since the mounting section 34a is in the extended position of FIG. 8, the piston rod 162 engages the guide post 66a at a location immediately below the recess 164.

Figure 8:
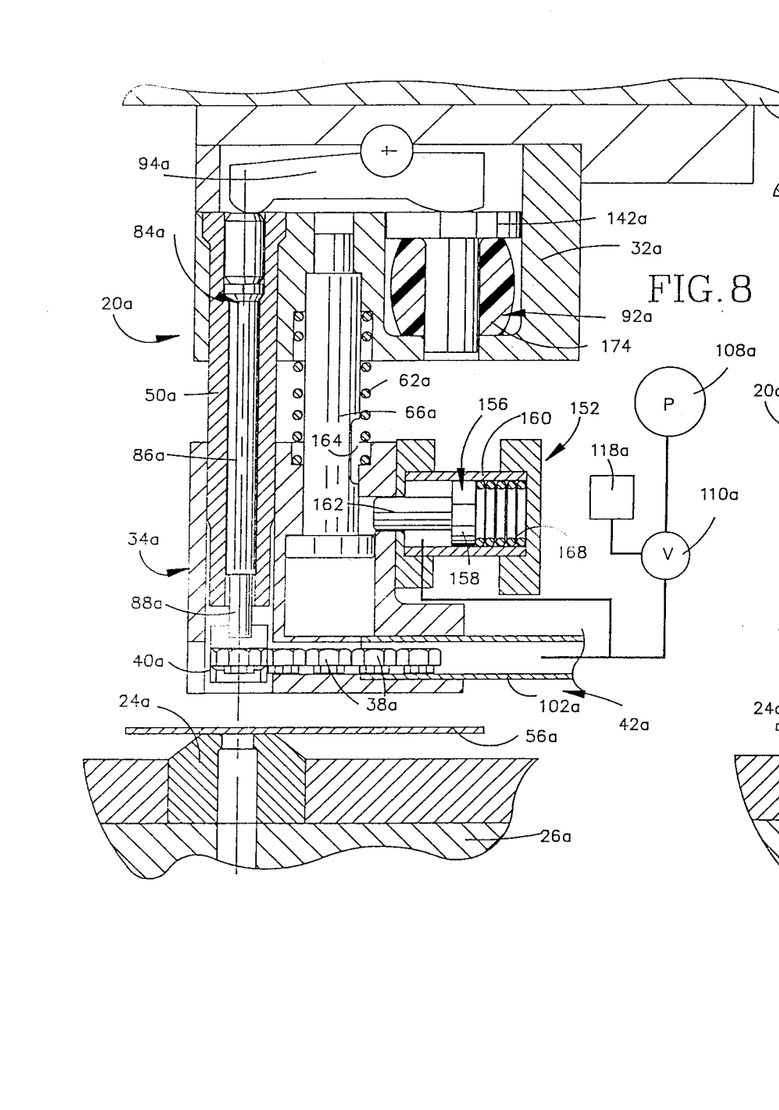
FIG. 8 is a sectional view, generally similar to FIG. 7, illustrating the apparatus in an extended position in which the punch is spaced from the loading station and a fastener has moved to the loading station.

As the press is operated toward the closed condition, the upper platen 22a moves toward the stationary lower platen 26a to bring the mounting section 34a into engagement with the upper side surface of the workpiece 56a while the mounting section is in the extended position shown in FIG. 8. Continued closing movement of the press results in the base 32a moving toward the mounting section 34a. As this occurs, the leading end 88a of the ejector pin 86a moves into a central opening in a fastener 38a disposed at the loading station 40a. This centers the fastener relative to the punch 50a. Continued closing of the press moves the lower end surface of the punch 50a into engagement with the upper surface of the fastener 38a at the loading station 40a. Still further closing movement of the press causes the lower end surface of the ejector pin 86a to engage the sheet metal member 56a and press it against the die 24a.

As the press continues to close, the ejector pin 86a remains stationary and the punch 50a presses the lower piercing or leading end of the fastener 38a against the sheet metal member 56a (FIG. 9). At this time, the ejector pin 86a will have moved slightly upwardly relative to the punch 50a to pivot the rocker arm 94a from the position shown in FIG. 8 to the position shown in FIG. 9. This compresses the spring assembly 92a to urge the lower end of the ejector pin 86a downwardly against the sheet metal member 56a. As the press closes from the position shown in FIG. 8 to the position shown in FIG. 9, the guide post 66a moves downwardly so that the piston rod 162 in the retainer assembly 152 can move back into the recess 164 under the influence of the spring 168.

Still further closing movement of the press severs a slug or portion 58a (FIG. 10) from the remainder of the workpiece 56a due to cooperation between the leading or lower end of the fastener 38a and the die 24a. As the slug 58a is severed from the workpiece 56a, the force applied by the spring assembly 92a against the rocker arm 94a pivots the rocker arm in a counterclockwise direction to force the ejector pin 86a downwardly and move the slug 58a away from the upper end portion of the die 24a. This clears the die 24a so that the die does not jam during the next operation of the fastener mounting apparatus 20a.

The spring assembly 92a includes a body 174 of resilient material which is compressed by a piston 142a as the press closes. Although the body 174 of resilient material is used to provide the spring force in the embodiment of the invention illustrated in FIGS. 7-10, it should be understood that a metallic spring, similar to the Belleville washers 144 of the embodiment of the invention shown in FIGS. 1-6 or a coil spring could be used.

Conclusion

The present invention relates to an apparatus 20 which is used with a press to mount fasteners 38 during operation of the press. As the press is closed, a fastener mounting section 34 engages a member 56 and is moved relative to a punch 50. As the fastener mounting section 34 moves relative to the punch 50, the punch applies force against the fastener 38 to press the fastener against the member 56 (FIG. 5) and sever a portion or slug 58 from the member (FIG. 6).

An ejector assembly 84 applies force against the member 56 during mounting of the fastener 38 to move the slug 58 away from a die 24. The ejector assembly 84 includes an ejector pin 86 which is disposed in a coaxial relationship with and is at least partially enclosed by the punch 50. A spring assembly 92 is offset to one side of the punch 50. A rocker arm 94 transmits force from the spring assembly 92 to the ejector pin 86 to press the ejector pin against the member 56 in which the fastener 38 is to be mounted at a location which is coaxial with the punch (FIG. 5).

A conveyor 42 is connected with the fastener mounting section 34 and holds a series of fasteners 38 (FIG. 4) which are sequentially conducted to a loading station 40 during operation of the press. The conveyor 42 applies a loading force against the series of fasteners urging the series of fasteners toward the loading station 40 during a portion of each operating cycle of the press to thereby move the leading fastener in the series of fasteners to the loading station. The force applied against the series of fasteners by the conveyor is terminated by closing the valve 110 during another portion of the operating cycle of the press to reduce the force urging the fasteners toward the loading station 40. By reducing the force which urges the fasteners 38 toward the loading station 40, a jamming of the fasteners 38 with each other and/or the punch at the loading station is prevented.

In the embodiment of the invention illustrated in FIGS. 7-10, a retainer assembly 152 is operable to hold the fastener mounting section 34a in an intermediate position (FIG. 7) in which the punch 50a extends into the loading station 40a to block movement of fasteners 38a to the loading station. When the valve 110a is actuated to apply a loading force against the fasteners 38a in the conveyor 42a, the retainer assembly 152 releases the fastener mounting section 34a for movement from the intermediate position (FIG. 7) to an extended position (FIG. 8). When the mounting section 34a is in the extended position, the punch 50 is spaced from the loading station 40 to enable a fastener 38a to move into the loading station (FIG. 8).

Having described specific preferred embodiments of the invention, the following is claimed:

1. An apparatus for use with a press having sections which are relatively movable to mount a fastener in a member as the fastener cooperates with a die to sever a portion of the member during operation of the press from an open condition to a closed condition, said apparatus comprising a base adapted to be connected with one of the sections of the press, a punch connected with said base, a fastener mounting section movable relative to said punch and base along a path extending parallel to a central axis of said punch during operation of the press between the open and closed conditions, a guide post connected with said base and fastener mounting section for guiding relative movement between said base and fastener mounting section during operation of said press between the open and closed conditions, said guide post being offset from the extending parallel to said punch, conveyor means connected with said fastener mounting section for conducting the fastener to said fastener mounting section, said punch including surface means for applying force against the fastener during operation of the press from the open condition to the closed condition to press the fastener against the member and sever a portion from the member due to the cooperation between the fastener and the die, and ejector means for applying force against the member during mounting of the fastener to move the severed portion of the member relative to the remainder of the member, said ejector means including an ejector pin disposed in a coaxial relationship with and at least partially enclosed by said punch, said ejector pin being movable along the central axis of said punch through an opening in the fastener during mounting of the fastener in the member, spring means offset to one side of said punch and ejector pin, and force transmitting means for transmitting force from said spring means to said ejector pin to press said ejector pin against the member at a location which is coaxial with said punch during mounting of the fastener in the member.

2. An apparatus as set forth in claim 1 wherein said spring means is compressable under the influence of force transmitted from said ejector pin to said spring means by said for transmitting means prior to severing of the portion of the member by the interaction between the fastener and the die during mounting of the fastener.

3. An apparatus as set forth in claim 2 wherein said force transmitting means includes a rocker arm which is pivotal in a first direction by said ejector pin to compress said spring means prior to severing of the portion of the member by the fastener and die and is pivotal in a second direction by said spring means upon severing of the portion of the member by the fastener and die during mounting of the fastener.

4. An apparatus as set forth in claim 3 wherein said guide post and spring means are offset in the same direction from said punch, said rocker member being pivotal about an axis which is disposed between and extends transversely to central axes of said guide post and spring means.

5. An apparatus as set forth in claim 1 wherein said spring means and guide post are offset in the same direction from said punch means, said spring means being offset further from said punch means than said guide post.

6. An apparatus as set forth in claim 1 wherein said base and fastener mounting section are movable relative to each between a retracted position and an extended position, said apparatus further including biasing means separate from said spring means for urging said base and fastener mounting section toward the extended position.

7. An apparatus as set forth in claim 6 wherein said fastener mounting section and base move through an intermediate position during relative movement between the retracted and extended positions, said biasing means urging said fastener mounting section and base away from the intermediate position toward the extended position, and retainer means for retaining said base section and fastener mounting section in the intermediate position against the influence of said biasing means.

8. An apparatus for use with a press having sections which are repetitively moved relative to each other during operating cycles of the press to sequentially mount a plurality of fasteners in members, said apparatus comprising a base adapted to be connected with one of the sections of the press, punch means connected with said base for applying force against each of the fasteners in turn during operating cycles of the press to sequentially mount the fasteners in members, a fastener mounting section connected with said base, said fastener mounting section and base being relatively movable during operating cycles of the press, said fastener mounting section including a loading station for sequentially receiving fasteners during a plurality of operating cycles of the press, said punch means including surface means for applying force against each of the fasteners in turn to move each fastener in turn from the loading station and press each fastener in turn against a member during relative movement between said mounting section and base, and conveyor means connected with said fastener mounting section for holding a series of fasteners and for sequentially conducting each fastener in turn to the loading station during operation of the press, said conveyor means including means for applying a loading force against the series of fasteners urging the series of fasteners toward the loading station during one portion of each operating cycle of a plurality of operating cycles of the press to move a leading fastener in the series of fasteners to the loading station during the one portion of each operating cycle of a plurality of operating cycles of the press and for terminating the application of loading force against the series of fasteners during another portion of each of the plurality of operating cycles of the press to reduce the force urging the series of fasteners toward the loading station during the other portion of each operating cycle of the plurality of operating cycles of the press.

9. An apparatus as set forth in claim 8 wherein said mounting section and base are relatively movable between a retracted position in which said punch means extends through said loading station and an extended position in which said punch means is spaced from said loading station, said mounting section and base being in the extended position during at least part of the one portion of each operating cycle of the plurality of operating cycles of the press and being in the retracted position during at least part of the other portion of each operating cycle of the plurality of operating cycles of the press.

10. An apparatus as set forth in claim 9 wherein said mounting section and base move through an intermediate position during relative movement between the retracted and extended positions, said apparatus further including biasing means for urging said mounting section and base toward the extended position and retainer means for retaining said mounting section and base in the intermediate position against the influence of said biasing means during a part of each operating cycle of the press.

11. An apparatus as set forth in claim 9 wherein at least a portion of said punch means extends into the loading station when said mounting section and base are in the intermediate position, said conveyor means being operable to apply the loading force against the series of fasteners to press the leading fastener against said punch means when said mounting section and base are in the intermediate position.

12. An apparatus as set forth in claim 11 wherein said fasteners cooperate with a die to sever a portion from each of the members in turn during the mounting of the fasteners in each of the members turn, said apparatus further including ejector means for applying force against each of the members in turn during the mounting of a fastener in a member to move a severed portion of a member relative to the remainder of the member, said ejector means including an ejector pin disposed in a coaxial relationship with and at least partially enclosed by said punch means, said ejector pin being movable along a central axis of said punch means during mounting of a fastener, spring means offset to one side of said punch means and ejector pin, and force transmitting means for transmitting force from said spring means to said ejector pin to press said ejector pin against a member at a location which is coaxial with said punch means during mounting of a fastener in the member.

13. An apparatus for use with a press having sections which are repetitively movable relative to each other during operating cycles of the press to sequentially mount a plurality of fasteners in members, said apparatus comprising a base adapted to be connected with one of the sections of the press, a punch connected and projecting outwardly from said base, a fastener mounting section movable relative to said punch and base along a path extending parallel to a central axis of said punch during operating cycles of the press, said fastener mounting section including a loading station, said fastener mounting section being movable relative to said punch and base between a retracted position in which said punch extends through said loading station, an extended position in which said punch is spaced from said loading station, and an intermediate position disposed between said retracted and extended positions and in which an end portion of said punch extends into said loading station, a guide post connected with said base and fastener mounting section for guiding relative movement between said base and fastener mounting section during operation of said press, said guide post being offset from the extending parallel to said punch, biasing means for urging said fastener mounting section toward the extended position, retainer means for retaining said fastener mounting section in the intermediate position against the influence of said biasing means, said retainer means being operable between an engaged condition in which said retainer means cooperates with said guide post to hold said fastener mounting section against movement from the intermediate position during one portion of an operating cycle of the press and a disengaged condition in which said retainer means is ineffective to prevent movement of said fastener mounting section from the intermediate position to the extended position under the influence of said biasing means during another portion of an operating cycle of the press, conveyor means connected with said fastener mounting section for sequentially conducting each fastener in turn to the loading station when said retainer means is in the disengaged condition and said punch is spaced from the loading station during the other portion of the operating cycle of the press, and means for operating said retainer means from the disengaged condition to the engaged condition during movement of said fastener mounting section from the retracted position toward the extended position under the influence of said biasing means to retain said fastener mounting section in the intermediate position with the end portion of said punch blocking movement of a fastener to the loading station during the one portion of an operating cycle of the press and for operating said retainer means from the engaged condition to the disengaged condition to release said fastener mounting section for movement from the intermediate position to the extended position during the other portion of an operating cycle of the press to move the end portion of said punch out of the position blocking movement of fasteners to the loading station to enable said conveyor means to move a fastener to the loading station.

14. An apparatus as set forth in claim 13 wherein said conveyor means includes means for applying a loading force against a series of fasteners in said conveyor means urging the series of fasteners toward the loading station when said retainer means is in the disengaged condition to move a leading fastener in the series of fasteners to the loading station during the other portion of each operating cycle of a plurality of operating cycles of the press and for terminating the application of the loading force against the series of fasteners when said retainer means is in the engaged condition to reduce the force urging the series of fasteners toward the loading station during the one portion of each operating cycle of a plurality of operating cycles of the press.

15. An apparatus as set forth in claim 14 wherein said means for operating said retainer means from the disengaged condition to the engaged condition and from the engaged condition to the disengaged condition includes a fluid pressure responsive actuator, said means for applying a loading force against a series of fasteners in said conveyor means includes means for effecting the application of a fluid pressure force against the series of fasteners in said conveyor means and a fluid pressure force against said fluid pressure responsive actuator.

16. An apparatus as set forth in claim 13 wherein said guide post is fixedly secured to either said fastener mounting sections or said base and said retainer means is connected to the other one of said fastener mounting section and said base.

17. An apparatus as set forth in claim 13 further including ejector means for applying force against each of the members in turn during the sequential mounting of fasteners in the members to move severed portions of the members relative to the remainder of members, said ejector means including an ejector pin disposed in a coaxial relationship with and at least partially enclosed by said punch, said ejector pin being movable along a central axis of said punch through an opening in each fastener in turn during mounting of the fasteners, spring means offset to one side of said punch and ejector pin, and force transmitting means for transmitting force from said ejector pin against a member at a location which is coaxial with said punch during mounting of a fastener in the member.

* * * * *